United States Patent [19]

Karau et al.

[11] Patent Number: 4,596,218
[45] Date of Patent: Jun. 24, 1986

[54] LPP COMBUSTION CONTROL FOR IC ENGINE WITH ABNORMAL COMBUSTION

[75] Inventors: Philip A. Karau; Anthony L. Marks, both of Anderson, Ind.; James H. Currie, Rochester, Mich.

[73] Assignee: General Motors Corporation, Detroit, Mich.

[21] Appl. No.: 761,052

[22] Filed: Jul. 31, 1985

[51] Int. Cl.[4] ............................................. F02P 5/15
[52] U.S. Cl. .................................................. 123/425
[58] Field of Search ............................... 123/425, 435

[56] References Cited

U.S. PATENT DOCUMENTS

| | | | |
|---|---|---|---|
| 3,205,880 | 9/1965 | Hartel et al. | 123/146.5 |
| 3,875,912 | 4/1975 | Bullo | 123/425 |
| 3,957,023 | 5/1976 | Peterson | 123/425 |
| 4,063,538 | 12/1977 | Powell et al. | 123/425 |
| 4,131,097 | 12/1978 | Sawada et al. | 123/425 |
| 4,153,019 | 5/1979 | Laubenstein et al. | 123/425 |
| 4,190,027 | 2/1980 | Inui et al. | 123/425 |
| 4,211,194 | 7/1980 | Hattori et al. | 123/417 |
| 4,231,091 | 10/1980 | Motz | 364/431 |
| 4,406,265 | 9/1983 | Brandt et al. | 123/425 |
| 4,429,365 | 1/1984 | Luckman et al. | 364/431.08 |
| 4,450,811 | 5/1984 | Ichikawa | 123/425 |
| 4,481,925 | 11/1984 | Karau et al. | 123/425 |
| 4,491,010 | 1/1985 | Brandt et al. | 73/35 |

Primary Examiner—Andrew M. Dolinar
Attorney, Agent, or Firm—Robert M. Sigler

[57] ABSTRACT

An LPP ignition timing control for an internal combustion engine of the type having a normal combustion mode characterized by combustion pressure peaks compatible with closed loop LPP ignition timing control and an abnormal combustion mode which may not be so compatible includes a closed loop control apparatus effective to sense LPP in the combustion chamber, generate an LPP value therefrom, store a DLPP value indicative of a desired LPP, and compare the LPP value and stored DLPP value and adjust ignition timing to reduce the difference therebetween. During a sensed abnormal combustion mode, the control changes the ignition timings for ignition events toward predetermined, stored ignition timings and substitutes for the stored DLPP value temporary DLPP values which are a predetermined crankshaft angle in advance of the generated LPP values and limited in the retard direction to the stored DLPP value. After the termination of the abnormal combustion mode the control continues the substitution of the temporary DLPP values for the stored values until the former comes within a predetermined crankshaft angle of the latter. The abnormal combustion mode may be sensed as excessive variation in LPP, excessively advanced average LPP or excessive numbers of undetected combustion pressure peaks.

9 Claims, 4 Drawing Figures

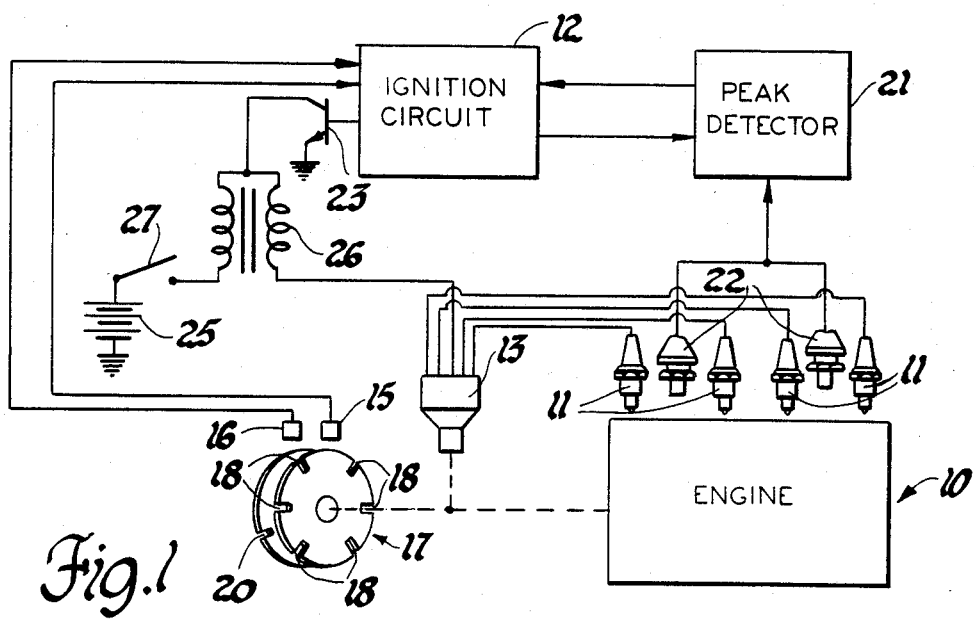
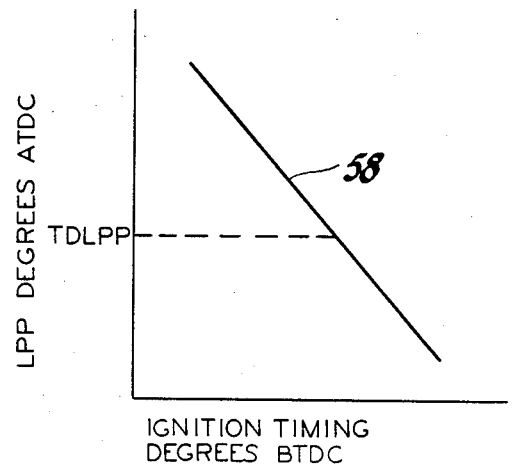
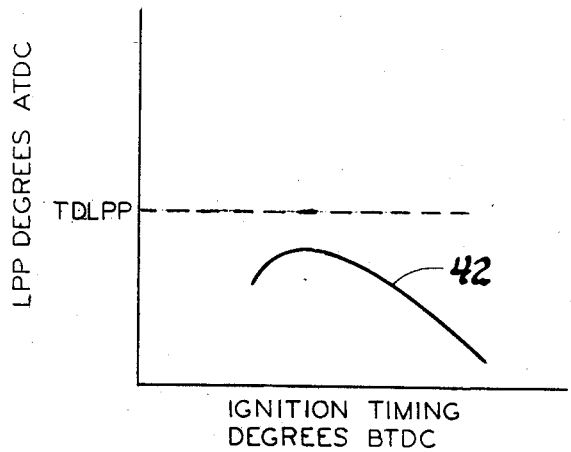

LPP COMBUSTION CONTROL FOR IC ENGINE WITH ABNORMAL COMBUSTION

BACKGROUND OF THE INVENTION

This invention relates to a closed loop LPP ignition timing control for an internal combustion engine suitable for a motor vehicle. In such a control, the location, in crankshaft angle relative to top dead center, of peak pressure in the combustion chamber (LPP) is compared with a desired location of peak pressure (DLPP); and an engine ignition parameter such as spark timing is adjusted to return LPP toward the desired value. DLPP is generally about 15 degrees ATDC, although this may vary from one engine or engine operating mode to another.

An LPP ignition timing control of this type is shown in the U.S. Pat. No. 4,481,925, to Karau et al issued Nov. 13, 1984. In this system, the signal from a combustion pressure sensor is processed by a peak detector and an LPP signal generated to control engine spark timing in a closed loop feedback control. However, the accurate operation of a closed loop system as shown in Karau depends upon the presence of certain events and relationships which are generally assumed but are, unfortunately, not always present for all engine operating conditions. For example, a detectable peak combustion pressure must exist and be accurately assignable to a particular crankshaft angular position. The LPP point must not be varying too greatly or quickly for stable closed loop control. Changes in ignition timing must produce predictable changes in LPP and must be capable of bringing LPP to the desired value, DLPP.

Although these conditions are true for most operating modes of a typical internal combustion engine, they can not always be relied upon. In particular, conditions of high dilution from exhaust gas recirculation or lean mixture, greatly retarded spark and light engine load result in slower burning combustion with a low, flat combustion pressure curve. Since most internal combustion engines have a plurality of combustion chambers, fuel tends to be unevenly distributed among them, even with the most careful design. As combustion becomes more marginal due to a high average dilution level, the percentage of misfires becomes higher. This leads to wide variations in the locations of detected pressure peaks or an increase in the percentage of non-existent or undetected peaks.

In addition, the relationship between LPP and ignition timing becomes adversely affected. In normal combustion the two are linearly related over most of the usable range of ignition timing, as shown in FIG. 2, wherein LPP in crankshaft degrees after top dead center is plotted as a function of spark advance or ignition in degrees before top dead center. Thus, a simple closed loop control is adequate to maintain LPP at the level marked TDLPP. However, in engine operating modes involving high fuel dilution and light engine loads, the curve of the relationship can appear as in FIG. 3, with a fold-over effect in the retarded spark region which prevents the desired value of TDLPP from being obtained at any spark advance value and further causes a reversal of the control relationship in the retarded spark area which requires modification of the closed loop system. These problems have not been addressed in the prior art.

SUMMARY OF THE INVENTION

It is thus an object of this invention to provide an ignition timing control for an internal combustion engine including a closed loop LPP ignition timing control which operates during normal combustion engine operation and an alternative ignition timing control which operates during the type of abnormal combustion engine operation which may not be compatible with simple closed loop control.

It is a further object of this invention to provide an ignition timing control as related in the previously recited object wherein both the initiation and end of the period of abnormal combustion operation are detected and LPP maintained as closely as possible to the true desired LPP during such period.

These and other objects are realized in an LPP ignition timing control for an internal combustion engine including a combustion chamber, means effective to ignite a combustible charge within the combustion chamber and power output apparatus including a rotating crankshaft driven in response to the expansion of the combustible charge following the ignition thereof and having a predefined TDC rotational reference position, the engine being of the type having a normal combustion mode characterized by combustion pressure peaks compatible with closed loop LPP ignition timing control and an abnormal combustion mode which may not be so compatible, the ignition timing control comprising, in combination, means effective to sense LPP in the combustion chamber and generate an LPP value therefrom, means effective to store a DLPP value indicative of a desired LPP, means effective, during the normal combustion mode, to compare the LPP value and stored DLPP value and adjust ignition timing to reduce the difference between the LPP and DLPP values, means effective to sense the abnormal combustion mode and, for the duration of the abnormal combustion mode, both change the ignition timings for ignition events toward predetermined, stored ignition timings and substitute for the stored DLPP value temporary DLPP values which are a predetermined crankshaft angle in advance of the generated LPP values, the temporary DLPP value being limited in the retard direction to the stored DLPP value, and means effective after the termination of the abnormal combustion mode to continue the substitution of the temporary DLPP values for the stored values until the former comes within a predetermined crankshaft angle of the latter, whereby, when closed loop LPP ignition timing with the stored DLPP value is unobtainable, the ignition is adjusted to produce LPP closest to that desired.

The invention is further described in detail in the accompanying drawings and following description of a preferred embodiment.

SUMMARY OF THE DRAWINGS

FIG. 1 is a schematic diagram of an internal combustion engine incorporating an ignition timing control according to this invention.

FIG. 2 is a plot of LPP as a function of spark advance during the normal mode of operation of the engine of FIG. 1.

FIG. 3 is a plot of LPP as a function of spark advance during the abnormal mode of operation of the engine of FIG. 1.

DESCRIPTION OF THE PREFERRED EMBODIMENT

Figure 4:
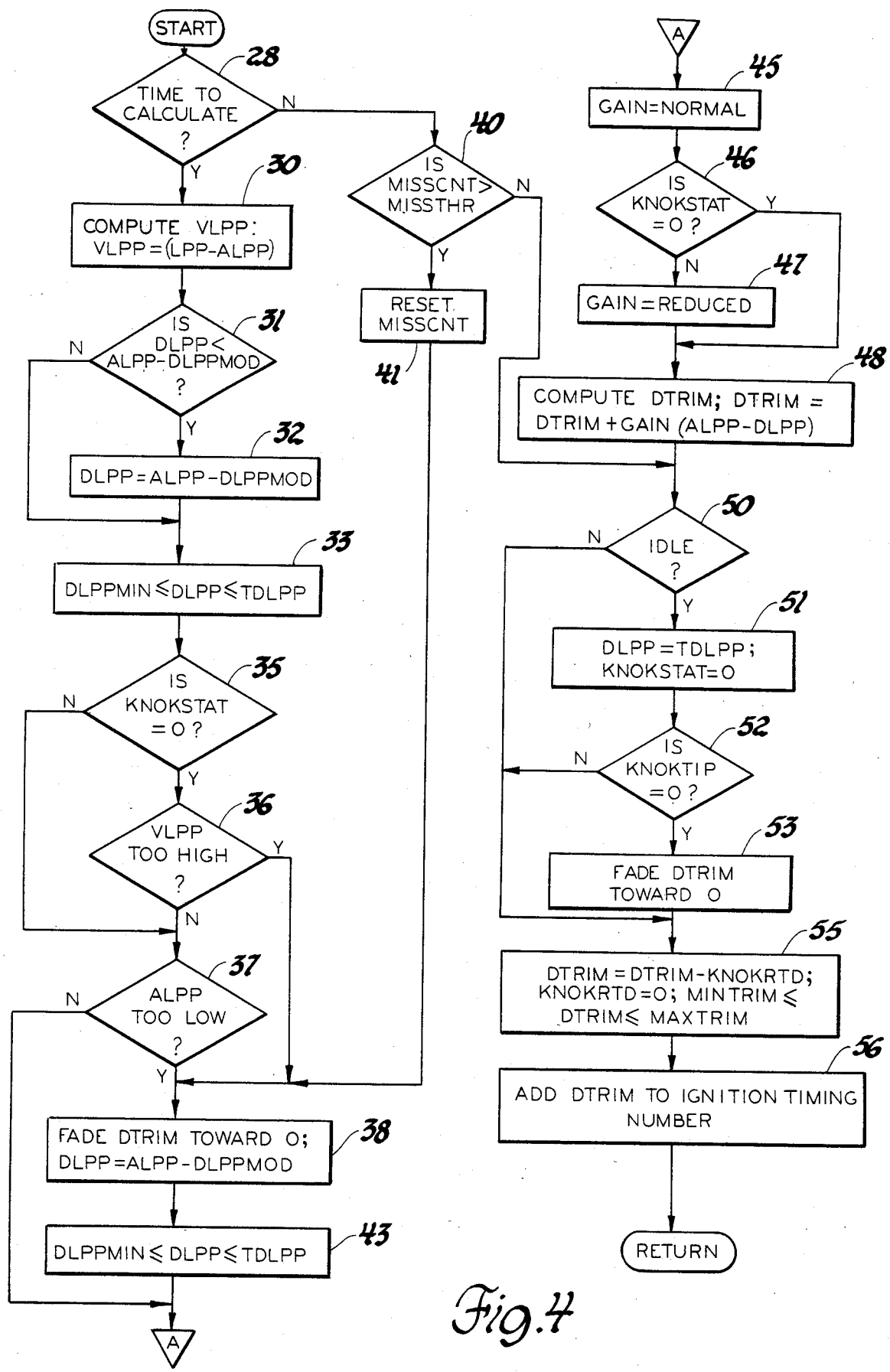
FIG. 4 is a flow chart describing a portion of the operation of the control incorporated in the engine of FIG. 1.

Referring to FIG. 1, an internal combustion engine 10 includes a plurality of combustion chambers, not shown, in which combustible charges are ignited by means of spark plugs 11 to generate power through the expansion of gases against pistons and cause rotation of an engine crankshaft, not shown, in the normal manner of such engines. An ignition circuit 12 generates spark firing pulses which are routed to the proper spark plugs 11 through a distributor 13 or similar apparatus as is common in the prior art. Ignition circuit 12 may comprise a programmed digital computer which receives input timing pulses from a magnetic pickup 15 and sync pulses from a magnetic pickup 16. Pickups 15 and 16 are associated with a notched wheel 17 having a plurality of timing pulse generating notches 18 and a sync pulse generating notch 20 associated with respective pickups 15 and 16 to generate the pulses therein. For example, wheel 17 may be part of the crankshaft counterbalance; and pickups 15 and 16 may be of the variable reluctance type. Notch 20 and its associated pickup 16 may be axially displaced slightly from notches 18 and pickup 15 to keep the signals separate. The position signals from such an arrangement may be made very accurate by placing the apparatus on a torsional vibration node of the crankshaft. An alternative arrangement is to provide vanes of a magnetic material on a wheel at the front of the engine crankshaft with Hall effect sensors. From these pulses, ignition circuit 12 determines a reference crankshaft position for the firing of each spark plug 11 in proper succession. In the case of a four cylinder engine and a six notch wheel which rotates twice during a complete cycle of all four cylinders, every third pulse generated by notches 18 will correspond to a new cylinder and two successive such notches mark a crankshaft angle of 60 degrees. Notch 20 provides a sync pulse to identify the individual timing pulses. The pulses from notches 18 and 20 are preferably used as the reference pulses for the entire ignition timing control for greatest accuracy; however, the normal distributor pulse generator may be used for the basic ignition timing reference pulses if necessary.

One or more combustion chamber pressure sensors 22 provide signals to a peak detector 21, which determines from said signals the location, relative to a TDC crankshaft reference, of peak pressure (LPP) for each ignition event, if possible, and generates a number representing LPP for output. Combustion pressure sensors 22 may be of any known type but may particularly be of the type comprising a head bolt for engine 10 in conjunction with a quartz force ring compressed thereunder or of the type in which the head bolt itself includes a piezoelectric element affixed to the bolt head for flexure therewith. A preferred form of the latter type of sensor is shown in the U.S. Pat. No. 4,491,010, to Brandt et al issued Jan. 1, 1985. In the case of a head bolt sensor, two sensors may suffice for the timing of a four cylinder engine, with one placed between cylinders 1 and 2 and the other placed between cylinders 3 and 4. The signals may be ORed together at the input to peak detector 21.

Peak detector 21 may itself be of the type shown in the above-mentioned Karau et al patent. This detector determines, for each ignition event, the LPP when it occurs within a crankshaft angle window of approximately 60 degrees ATDC, as it will for all normal combustion modes of engine 10. A number representing LPP is sent from peak detector 21 to an input of ignition circuit 12. Alternatively, peak detector 21 may differentiate the pressure signal with appropriate filtering as shown in the U.S. Pat. No. 4,406,265, to Brandt et al issued Sept. 27, 1983.

Ignition circuit 12 includes a microprocessor based digital computer programmed to compute from the successive input LPP values an average LPP value (ALPP), determine ignition timing from this and other inputs as well as stored reference information and generate output ignition pulses at optimum times on the control electrode of an output power transistor 23 connected in series with a DC power source represented by vehicle battery 25, but understood to include all necessary components of a vehicle electrical power system. Transistor 23 is connected with battery 25 in the standard manner through the primary winding of a standard ignition coil 26 and the vehicle ignition switch 27. A secondary winding of ignition coil 26 is connected to provide high voltage pulses through distributor 13 to spark plugs 11 in the usual manner. Ignition circuit 12 may be based on that shown in the U.S. Pat. No. 4,231,091, to Motz issued Oct. 28, 1980, modified where necessary as described herein.

Ignition circuit 12 calculates, for each ignition event, the desired ignition timing relative to a reference engine crankshaft angle. Factors related to engine speed and load are stored in appropriate memory lookup tables and selected in response to the input of engine speed and load sensors as described in the Motz patent and other prior art references. This timing represents a stored ignition timing for the particular combination of engine speed and load, which is adjusted by a trim value (DTRIM) derived from the LPP numbers received from peak detector 21. Thus, in the system of this embodiment, there is a standard, stored ignition timing available for each ignition event; and the LPP ignition timing operates as a trim upon that timing. Therefore, if the LPP closed loop is not available for control in some engine operating mode, there is a stored value of ignition timing toward which the system can be shifted.

The operation of that portion of ignition circuit 12 which computes the trim will be described with reference to FIG. 4. It is assumed that ignition circuit 12 has computed a standard or base ignition timing and stored it in a register or RAM memory location. It also assumes that ignition circuit 12 maintains a stored and continually updated value of the average location of peak pressure, ALPP, which may be computed according to a standard digital lag filter equation from each new value of LPP received from peak detector 21. A typical first order lag filter equation will be of the form $ALPP_n = ALPP_{n-1} + G(LPP - ALPP_{n-1})$, wherein $ALPP_n$ is the new ALPP, $ALPP_{n-1}$ is the previously calculated ALPP, LPP is the latest input value of LPP and G is a proportional gain factor. A first order filter is considered sufficient; however, those skilled in the art will be able to determine for themselves what filter equation to use according to their own requirements and to calibrate the gain constant G upon testing a particular engine. The flow chart of FIG. 4 may be considered a subroutine of the main program of ignition circuit 12.

The subroutine of FIG. 4 starts with a decision point 28, in which it is determined if it is time to calculate the trim value DTRIM. The subroutine will typically run many times for each ignition event; and the calculation is performed only once for each cycle, at a time after the receipt of an LPP number from peak detector 21 or the determination of no detectable peak. The latter determination is made by ignition circuit 12 when either no LPP number has been received from peak detector 21 by the end of the 60 degree window after TDC or the LPP number which is received fails some predetermined criteria. If it is time to calculate, the variation in LPP is first calculated at step 30 according to the equation VLPP=LPP−ALPP, where LPP is the most recently sensed value of LPP, and the VLPP value stored in a register or RAM memory location.

The subroutine then determines, at decision point 31, if the desired location of peak pressure, DLPP, is less than the average location of peak pressure, ALPP, less a factor DLPPMOD. If it is, then DLPP is set equal to ALPP−DLPPMOD in step 32. If not, step 32 is skipped. The next step, in either case, is step 33, in which DLPP is adjusted to be within the upper limit of TDLPP, a stored constant DLPP value which may be thought of as the "true" desired LPP, and a lower limit of DLPPMIN, the minimum acceptable desired LPP. It will be apparent to the reader that, if DLPP has been set to a value higher than TDLPP in step 32, it will be returned to TDLPP in step 33. Thus, DLPP is allowed to vary downward from the stored value TDLPP as far as DLPPMIN but not upward from TDLPP. Blocks 31–33 actually have no effect during normal operation of engine 10 except when the system is recovering to normal operation at the end of a period of abnormal operation, as described at a later point in this description.

If the system is provided with knock control, the subroutine next determines if the system is in the knock control mode by asking, at decision point 35 if KNOKSTAT equals zero. KNOKSTAT is a counter value set to a predetermined number in response to the initial detection of knock and allowed to count downward, once per ignition event, to zero. Thus a non-zero value of KNOKSTAT indicates that the system is in a knock recovery mode and that VLPP should be ignored. Knock may be detected from the same detectors 22 by examining the energy present in the sensor signal in a frequency range associated with knock induced combustion chamber pressure vibrations for a particular engine, such as 6-8 kilohertz. It may also be detected from a separate knock sensor and associated signal processing circuitry. No knock detector is shown in this description; but if knock information is available from any knock control system, of which there are many in the prior art, this ignition timing control is compatible with it.

If KNOKSTAT equals zero, which signifies that no knock correction is presently employed, the subroutine proceeds to determine, at decision point 36, if the value of VLPP, computed above and stored, is too high, by comparing it with a stored reference limit. If either KNOKSTAT does not equal zero or VLPP is not too high, the subroutine proceeds to determine, at decision point 37, if ALPP is too low by comparing ALPP with a stored reference limit.

If VLPP is too high or ALPP is too low, the subroutine reaches step 38. These two conditions, VLPP too high and ALPP too low, are two of three methods in this embodiment of determining an abnormal engine operating condition in which closed loop LPP ignition control is to be modified. If VLPP is too high, the closed loop system will not be stable, since the sensed variable is changing too greatly. The system would tend to hunt all over the operating range for a nonexistent stable operating point; and it is better to move toward the stored ignition timing. If ALPP is too low, it is probable that the spark is too retarded and/or the fuel mixture is very dilute from high EGR or poor distribution; and peak combustion pressure will be difficult to accurately detect.

However, there is a third detection of abnormal combustion which leads to step 38. If, at decision point 28, it is determined that it is not time to calculate DTRIM, the subroutine proceeds to decision point 40, in which it is determined if a stored count of missed combustion peaks, MISSCNT, is greater than a threshold value MISSTHR. If it is, then MISSCNT is reset to a predetermined initial value at step 41; and the subroutine proceeds to step 38, since there have been too many lost peaks and the ALPP value can no longer be presumed to be accurate.

In step 38, DTRIM is faded toward zero so that the ignition timing moves in the direction of the stored ignition timing for the present engine speed and load conditions. This may be accomplished by decreasing the absolute value of DTRIM by a predetermined amount, which will have the effect of moving it closer to zero regardless of its sign. It should be clear at this point that an open loop influence is being introduced on the normal closed loop operation of the system, but the system is not taken immediately to the stored ignition timing. In addition, in step 38, DLPP is set to ALPP−DLPPMOD. DLPP is thus brought below ALPP. With reference to FIG. 3, wherein curve 42 shows the relationship between ignition timing and LPP for abnormal combustion, low LPP is generally associated with operation on the left portion of the curve where it folds over, since, as explained at a later point in this description, closed loop operation on this portion of the curve causes movement down the curve toward low LPP rather than back toward the maximum point. When DLPP is forced to be lower than ALPP, the closed loop response is to bring the operating point back up the curve toward the maximum point. In step 43, DLPP is confined to a maximum of TDLPP and a minimum of DLPPMIN. In successive cycles of the subroutine the operating point will gradually come back up the curve, as the ALPP is "chased" by the DLPP, until the maximum LPP is reached, which is still less than the desired TDLPP but is the best obtainable under the circumstances. The system will stabilize at this point until engine operating conditions produce a change in the curve. Steps 38 and 43 initiate the modification of simple closed loop control upon the detection of abnormal combustion in engine 10; but when the abnormal combustion indicating factors are no longer present the subroutine skips steps 38 and 43. It is for this reason that steps 31-33 are provided to work the system back into its normal closed loop operation at TDLPP. As the system recovers from the abnormal combustion mode and the relationship between ignition timing and LPP changes to that shown in FIG. 2, normal variations in LPP will generally be sufficient to enable the system to return to its normal operation with TDLPP as the desired LPP value.

From step 43, or from decision point 37 if ALPP is not too low, the subroutine proceeds to set a gain factor GAIN equal to a value called NORMAL in step 45. If KNOKSTAT is equal to zero, decision point 46 then causes step 47 to be skipped and GAIN to remain equal to NORMAL. Otherwise step 47 sets GAIN equal to a smaller factor called REDUCED. This smaller gain factor is used in recovery from knock as described at a later point in this description. DTRIM is computed in step 48 according to a first order lag filter function with the new DTRIM equal to the old DTRIM plus GAIN (or REDUCED) times the difference ALPP−DLPP. In the case of a cycle of the subroutine in which step 38 was reached, the old DTRIM will already have been faded toward zero from the value computed in the last cycle; and the difference ALPP−DLPP will have been set equal to DLPPMOD. Otherwise, the old DTRIM will be the value remaining from the last cycle and ALPP−DLPP will be variable. It may be seen that this equation produces the desired result of an advance in ignition timing (DTRIM is expressed in degrees BTDC) when ALPP is greater than DLPP (retarded, since ALPP and DLPP are espressed in degrees ATDC) for the normal curve 58 shown in FIG. 2 and the right hand portion of curve 42 shown in FIG. 3. On the left side of curve 42 of FIG. 3, setting DLPP below ALPP will cause the desired ignition timing advance which will bring the operating point back up the curve toward its maximum.

From step 48, or from decision point 40 if MISSCNT is not greater than MISSTHR, the subroutine determines at decision point 50 from an appropriate signal or flag in a register if the engine 10 is idling. If so, DLPP is set equal to TDLPP and KNOKSTAT equal to zero in step 51; and then, at decision point 52, it is determined if KNOKTIP equals zero. KNOKTIP is a value of a counter initiated with a predetermined number when knock is detected and may be the same as or different from the counter KNOKSTAT. It is intended to control the knock recovery during engine idle conditions when any knock detected is most probably of the tip-in variety obtained by a driver initiated sudden throttle opening. If KNOKTIP equals zero, then DTRIM is faded toward zero in step 53 before the subroutine proceeds to step 55. If the engine is not found to be idling at decision point 50 or if KNOKTIP is not found to be zero at decision point 52, the subroutine advances directly to step 55. By skipping step 53 during the period of counter KNOKTIP, the system allows a period of retard for recovery of tip-in knock.

In step 55, DTRIM is adjusted by the knock trim value KNOKRTD, which represents a number of degrees of extra retard inserted immediately upon the detection of knock but, in the absence of such detection, is zero. KNOKRTD is then reset to zero and the system allowed to slowly recover on subsequent cycles by means of the closed loop with reduced gain until KNOKSTAT reaches zero, at which point it is allowed to recover the rest of the way, if necessary, at full gain. Also in step 55, DTRIM is restricted to a value between MINTRIM and MAXTRIM. In step 56 DTRIM is added to the ignition timing number representing the stored ignition timing and any other ignition timing adjustments which may be made. The resulting number is available for determination of actual ignition timing of the next ignition event as described in the Motz patent previously identified.

The embodiments of the invention in which an exclusive property or privilege is claimed are defined as follows:

1. An LPP ignition timing control for an internal combustion engine including a combustion chamber, means effective to ignite a combustible charge within the combustion chamber and power output apparatus including a rotating crankshaft driven in response to the expansion of the combustible charge following the ignition thereof and having a predefined TDC rotational reference position, the engine being of the type having a normal combustion mode characterized by combustion pressure peaks compatible with closed loop LPP ignition timing control and an abnormal combustion mode which may not be so compatible, the ignition timing control comprising, in combination:
   means effective to sense LPP in the combustion chamber and generate an LPP value therefrom;
   means effective to store a DLPP value indicative of a desired LPP;
   means effective, during the normal combustion mode, to compare the LPP value and stored DLPP value and adjust ignition timing to reduce the difference therebetween;
   means effective to sense the abnormal combustion mode and, for the duration of the abnormal combustion mode, both change the ignition timings for ignition events toward predetermined, stored ignition timings and substitute for the stored DLPP value temporary DLPP values which are a predetermined crankshaft angle in advance of the generated LPP values, the temporary DLPP value being limited in the retard direction to the stored DLPP value; and
   means effective after the termination of the abnormal combustion mode to continue the substitution of the temporary DLPP values for the stored values until the former comes within a predetermined crankshaft angle of the latter, whereby, when closed loop LPP ignition timing with the stored DLPP value is unobtainable, the ignition is adjusted to produce LPP closest to that desired.

2. An LPP ignition timing control according to claim 1 in which the abnormal combustion mode is sensed from an excessive variation in LPP.

3. An LPP ignition timing control according to claim 2 in which the generated LPP value is an average LPP and the variation in LPP is determined as the difference between a sensed LPP and the generated LPP value.

4. An LPP ignition timing control according to claim 1 in which the abnormal combustion mode is sensed from an average LPP in advance of a predetermined reference.

5. An LPP ignition timing control according to claim 1 in which the abnormal combustion mode is sensed from an excessive number of ignition events with no detected peak combustion pressure.

6. An LPP ignition timing control according to claim 1 in which the means effective to compare the LPP value and stored DLPP value and adjust ignition timing maintains an ignition trim value by adding to each consecutive value thereof a gain factor times the difference between the generated LPP value and a desired LPP value, the gain factor having a normal value and further having a reduced value for a predetermined time period in response to an input signal, the control further including means effective upon the initial receipt of the input signal to immediately introduce a predetermined retard to the ignition timing, the ignition timing then recovering toward that necessary to produce the desired LPP value at a slower rate for the predetermined time period of the reduced gain factor and at a faster rate thereafter, if necessary.

7. An LPP ignition timing control according to claim 6 in which the abnormal combustion mode is sensed from an excessive variation in LPP but such an excessive variation in LPP is ignored during the predetermined period of time initiated by the input signal.

8. An LPP ignition timing control according to claim 1 in which, during a sensed engine idle operating condition, the ignition timings for ignition events are changed toward the predetermined, stored ignition timings.

9. An LPP ignition timing control for an internal combustion engine including a combustion chamber, means effective to ignite a combustible charge within the combustion chamber and power output apparatus including a rotating crankshaft driven in response to the expansion of the combustible charge following the ignition thereof and having a predefined TDC rotational reference position, the engine being of the type having a normal combustion mode characterized by combustion pressure peaks compatible with closed loop LPP ignition timing control and an abnormal combustion mode which may not be so compatible, the ignition timing control comprising, in combination:

means effective to sense LPP in the combustion chamber and generate an average value ALPP therefrom;

means effective to store a value TDLPP indicative of a true desired ALPP;

means effective, during the normal combustion mode, to compare ALPP and TDLPP and adjust ignition timing to reduce the difference therebetween;

means effective to sense the abnormal combustion mode and, for the duration of the abnormal combustion mode, both introduce into the ignition timing of each successive ignition event a predetermined factor changing the ignition timing toward a predetermined, stored ignition timing and determine and substitute for TDLPP temporary values DLPP which are a predetermined crankshaft angle DLPPMOD in advance of ALPP, the temporary values DLPP being limited in the retard direction to TDLPP; and means effective after the termination of the abnormal combustion mode to continue to determine and substitute the temporary values DLPP for TDLPP until the former come within the predetermined crankshaft angle DLPPMOD of the latter, whereby, when closed loop LPP ignition timing with the stored DLPP value is unobtainable, the ignition is adjusted to produce LPP closest to that desired.

* * * * *